(No Model.) 2 Sheets—Sheet 1.
H. MANNERING.
MILK COOLER.
No. 368,726. Patented Aug. 23, 1887.
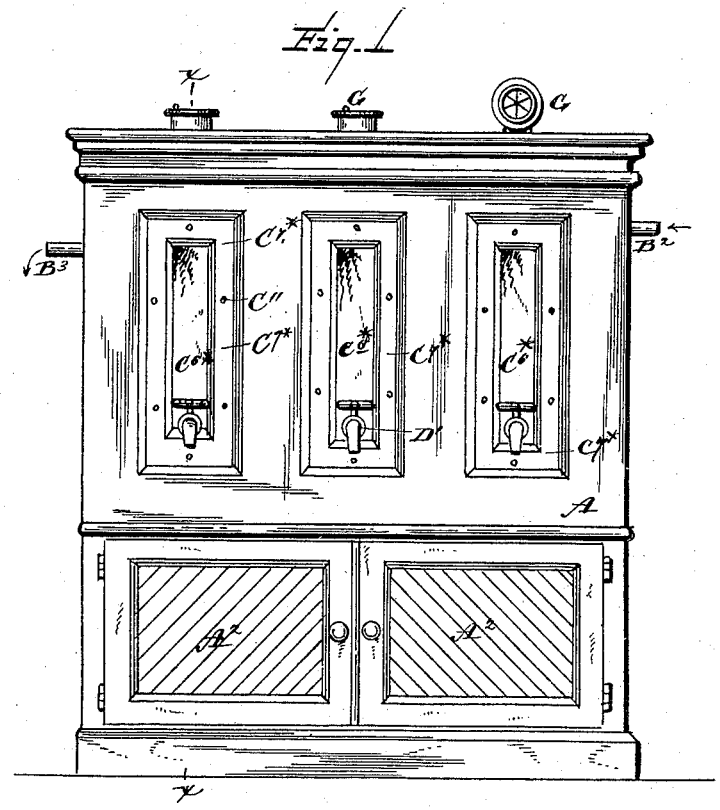
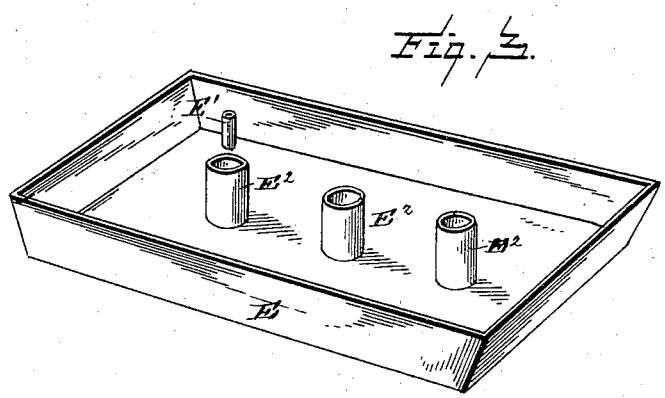
Witnesses
L. C. Hills
W. S. Davall
Inventor
Hollis Mannering
By his Attorney
E. B. Stocking (No Model.) 2 Sheets—Sheet 2.
H. MANNERING.
MILK COOLER.
No. 368,726. Patented Aug. 23, 1887.
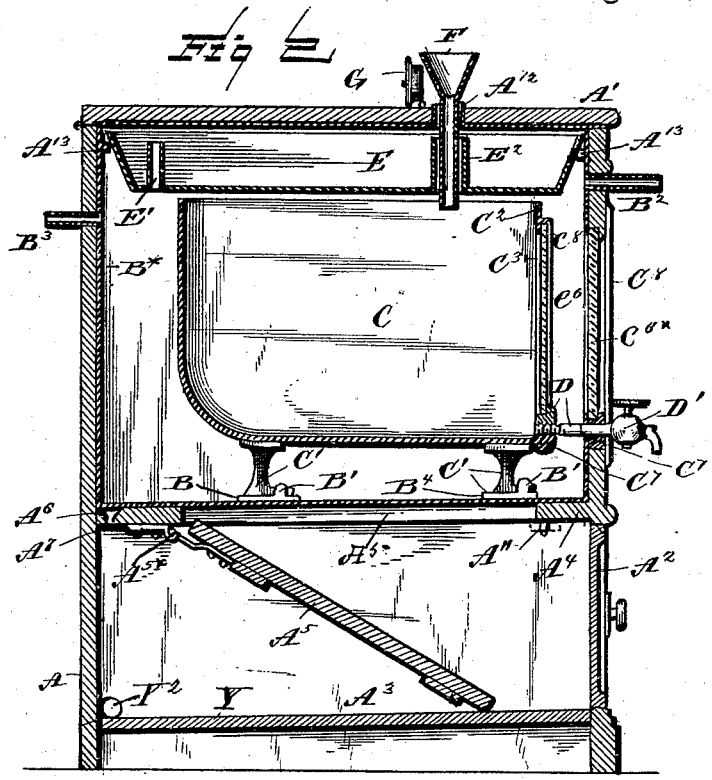
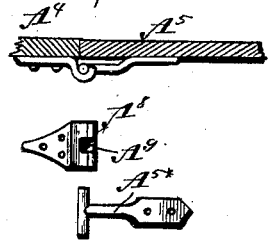
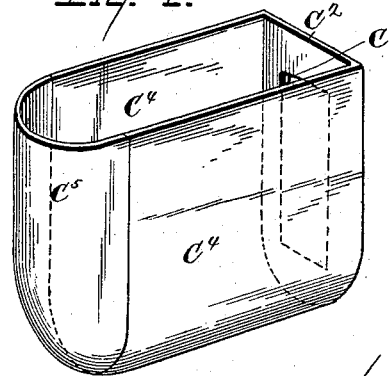
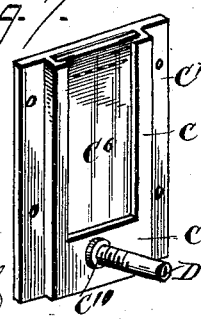
Witnesses
L. C. Hills,
W. S. Durall
Inventor.
Hollis Mannering.
By his Attorney
E. B. Stocking

UNITED STATES PATENT OFFICE.

HOLLIS MANNERING, OF SYRACUSE, NEW YORK.

MILK-COOLER.

SPECIFICATION forming part of Letters Patent No. 368,726, dated August 23, 1887.

Application filed March 8, 1887. Serial No. 230,161. (No model.)

*To all whom it may concern:*

Be it known that I, HOLLIS MANNERING, a citizen of the United States, residing at Syracuse, in the county of Onondaga, State of New York, have invented certain new and useful Improvements in Milk Coolers or Creamers, of which the following is a specification, reference being had therein to the accompanying drawings.

This invention has relation to milk-coolers and creamers of that class which is adapted to practice the deep-setting or Swedish method of raising cream; and the objects in view are to provide means for receiving and holding ice and water and delivering the water resulting therefrom into the water-receiving tank of the cooler; means for introducing milk into the can within the cooler without the necessity of removing the superimposed ice-tank; means for preventing the collection of dampness and the odors of decayed wood arising from the continuation of the same within the structure; means for giving access to the outer surface of the lining of the tank, and means which shall permit of the inspection of milk within the inclosed can to determine the position of the cream-line or the quantity of milk therein and water surrounding the cans.

Other objects and advantages of the invention will appear in the following description, and the novel features thereof will be particularly pointed out in the claims.

Referring to the drawings, Figure 1 is a front elevation of a cooler embodying my invention. Fig. 2 is a central vertical section on the line X of Fig. 1. Fig. 3 is a perspective of the ice-pan. Fig. 4 is a perspective of the milk-can. Fig. 5 is a side elevation and plans of a removable hinge-connection of parts, hereinafter described. Fig. 6 is a perspective of one of the ventilators. Fig. 7 is a perspective of a sight-glass and its frame-work, and Fig. 8 is a view of a portion of the sight-glass and its packing.

Like letters refer to like parts in all the figures.

A represents an outer cabinet or casing, which is provided with a cover, A', and at its lower front portion with doors $A^2$, leading into a lower compartment, $A^3$, of the cabinet, said compartment being provided for the reception of cream-pails or for articles—such as food or edibles—which it is desired to preserve, by reason of the temperature secured or maintained in said lower compartment by reason of a use of its upper compartment, as hereinafter described. A partition between the two compartments of the cabinet comprises any suitable frame-work, $A^4$, and a door or doors, $A^5$, connected with the frame-work at one edge by any suitable hinge, and connected at the other edge by any suitable button or door-retaining device.

A sheet-metal lining, $B^*$, is provided in the upper compartment, and its bottom, like the portion $A^4$, is inclined from front to rear, so that water within the tank, or condensed water upon its lower outer surface, will collect at the outlet at the rear edge of the tank. The frame $A^4$ at the point of collection is grooved, as at $A^6$, and apertured, as at $A^7$, so that any collection of moisture between the frame and the under surface of the tank shall be obviated, as the liquid of condensation will flow into the groove $A^6$ and through the aperture $A^7$ down into the lower compartment, $A^3$, and into any receptacle for the same placed therein.

It is apparent that the sweating of the outer surface of the tank acts to decompose the wood against which the tank rests, and when once decomposed the wood produces stale odors within the cabinet, which in time become sufficiently strong to contaminate any articles placed therein. For this reason I have provided the hinged door or doors $A^5$, in order that it or they may be dropped or removed from the lining of the tank portion to give access to its outer surface for the purpose of cleansing the same and thus preventing the collection of moisture and adding materially to the cleanliness and long service of the cabinet.

In Fig. 5 I have illustrated one form of hinge, which is preferable to an ordinary hinge which may be used in that the door $A^5$ is wholly separable by lifting the T member $A^{5*}$ of the hinge from the socket $A^8$, which is provided with a slot, $A^9$, for the reception of the neck of the T, so that the latter may move within the slot to permit the door to be dropped, as shown in Fig. 2, and at the same time will permit of the head of the T member being lifted out of the socket upwardly and away from the same, so that the door $A^5$ may be wholly disconnected from the partition. A button, $A^{11}$, at the opposite edge of the door, serves to secure the same in a closed position. Two doors $A^5$ are shown in Fig. 2, one being dropped and open and the other elevated or closed.

B represents a casting secured to the bottom of the tank and having a loop, $B'$, into which the feet $C'$ of the can C may be introduced in order to retain the can in a proper position within the tank. Each of the cans (of which in this instance three are employed within the cabinet, although the number thereof may be increased or diminished, as desired) is made of three, or, if desired, four pieces of sheet metal. The front wall, $C^2$, is provided with an opening, $C^3$, and has its lower end rounded, as clearly shown in Fig. 4. The side walls, $C^4$, may be composed of a single strip of sheet metal bent in U form, or of two strips joined together and bent in like form and having a seam or joint at the apex of the U, which occurs along the bottom of the can. The rear wall, $C^5$, is also of U form, as clearly shown, and is joined at the rear edges of the side walls by any usual well-known seam. The front end of the bottom of the can is slightly lower than the rear end, in order to furnish a complete drainage of the can through the pipe D, screw-threaded therein and terminating in a faucet, $D'$, arranged on the outside of the cabinet.

Over the opening $C^3$ of the front wall of the can there is arranged a sight panel or glass, $C^6$, which is mounted in a casting, $C^7$, having a grooved flange, $C^8$, for the reception of the glass. The glass may be provided at the edges with a rubber or other packing, $C^9$. The lower portion of the frame-work $C^7$ is provided with an aperture, $C^{10}$, in which the tube D is attached. A similar aperture is formed in a similar frame-work, which is mounted in an opening in the front of the cabinet, through which aperture the pipe D passes to the faucet $D'$.

In the frame-work, secured to the front wall of the cabinet, there are mounted sight panels or glasses $C^{6*}$, similar to those in the can. By this arrangement the position of the cream-line, or the quantity of milk within the can, and also water-line and state of water around the can, can be seen without removing the cover or the ice-tank from above the cans, and, also, when the cans are empty, they can be removed bodily from the tank by separating the connection of the pipe D with the can.

E represents the ice-pan, which is provided with an overflow-pipe, $E'$, so that, as the ice melts, the water collects in the pan and, when sufficiently deep, escapes through said pipe down into the tank proper. The latter is provided with a supply-pipe, $B^2$, and an overflow-pipe, $B^3$, so that spring or other water in a continual stream may be passed within, and be maintained at a depth a trifle below the upper edge of the can or cans in the tank, for the purpose of maintaining a uniform and sufficiently low temperature for the purpose of preserving the milk and separating the cream therefrom. The ice-tank E is also provided with a funnel-pipe, $E^2$, which extends to a height equal to the depth of the can, and which is arranged directly beneath a ventilating opening, $A^{12}$, on the cover $A'$ of the cabinet, whereby a funnel, F, may be inserted through the ventilating-opening and into the pipe $E^2$, so that milk may be introduced into the can C without lifting the cover and without removing the ice-pan. Each of the ventilators consists of an ordinary register-plate, G, and its damper-plate, $G'$, having a knob, $G^2$, by which the openings in the register-plate may be closed when desired. The collar of the register is provided with a hinge, $G^3$, which is secured to the cover $A'$ of the cabinet in such a position that when turned down the register shall cover the ventilating-opening $A^{12}$, and when turned up, as shown at the right of Fig. 1 and in Fig. 2, a funnel may be introduced, as shown and described.

This being the construction, the operation will be readily understood to be substantially as follows: Ice in lumps of convenient size is placed within the ice-pan E, and will of itself produce a temperature within the tank sufficiently low for the purpose of preserving the milk within the cans located therein, and with or without ice in the pan E, water of the proper temperature may be introduced by the pipe $B^2$ and delivered from the pipe $B^3$ to maintain said temperature. Whenever desirable, milk may be withdrawn from the can from the faucet $D'$. The sweat or moisture collecting between the lining and the partition may be removed by dropping the door $A^5$, as before described, in so far as the same shall not be conducted away by the rearward slant given to the partition and the means of escape provided therein for the same. By reason of the round bottom and rear wall of the can, together with the inclination of its bottom, there is less liability of the collection of the milk in the joints of the several parts of the can, and all square corners are avoided, in order that accessibility of the entire inner surface of the can for cleansing purposes shall be secured.

The ice-pan may be supported within the upper portion of the cabinet by a wedging action of its flared sides upon cleats $A^{13}$, secured to the walls of the lining, or in any other usual well-known manner, as by a flange resting upon the upper edge of the walls of the cabinet. The panel-frame $C^7$ is ordinarily soldered to the front wall of the can, while the panel-frame $C^{7*}$ is secured to the front wall of the cabinet by bolts or screws $C^{11}$. The bottom Y of the compartment $A^3$ is inclined to the rear, (see Fig. 2,) and is provided with a drip-outlet, $Y^2$.

Having described my invention and its operation, what I claim is—

1. In a cooler or creamer, a tank having an inclined bottom, and a removable partition for supporting said tank, having a moisture conducting and delivering groove, whereby water collected between the tank and the partition is conducted away, substantially as specified.

2. In a cooler or creamer, the combination, with the tank thereof, of a partition or tank-supporting floor arranged directly in contact with the tank, a portion of which floor is removable, the fixed portion having a moisture conducting and delivering groove, substantially as specified.

In testimony whereof I affix my signature in presence of two witnesses.

HOLLIS MANNERING.

Witnesses:
GEO. H. HUBB,
FRED. J. BAILEY.